United States Patent [19]

Siegfried et al.

[11] 4,238,098
[45] Dec. 9, 1980

[54] SPRING-ACTION SUSPENSORY DEVICE FOR ATTACHMENT TO OVERHEAD BEAMS

[76] Inventors: Gerald E. Siegfried, 3678 Charles St., Santa Clara, Calif. 95050; Donald C. Parson, deceased, late of Palo Alto, Calif.; by Carolyn K. Parson, adminstratrix, 3226 Waverly St., Palo Alto, Calif. 94306

[21] Appl. No.: 964,914

[22] Filed: Nov. 30, 1978

[51] Int. Cl.³ .............................................. E04G 5/06
[52] U.S. Cl. .................................. 248/217.2; 248/71; 248/226.5
[58] Field of Search ............... 248/217.2, 546, 544, 248/228, 71, 72, 58, 226.5, 317, 316 D; 24/260, 73 B, 81 B, 259 R

[56] References Cited

U.S. PATENT DOCUMENTS

| | | | |
|---|---|---|---|
| 1,237,428 | 8/1917 | Watrous | 248/217.2 X |
| 2,368,898 | 2/1945 | Swift | 248/226.5 X |
| 2,408,719 | 10/1946 | Abernethy | 248/72 X |
| 2,455,627 | 12/1948 | Uhlmann | 24/259 R X |
| 2,602,620 | 7/1952 | Patton | 248/217.2 X |
| 3,567,169 | 3/1971 | Frederick | 248/317 |
| 3,809,358 | 5/1974 | Hazeley | 248/317 |
| 3,936,913 | 2/1976 | Weissman | 248/317 X |
| 4,065,090 | 12/1977 | Mauney | 248/317 X |
| 4,074,885 | 2/1978 | Hacker | 248/317 |
| 4,135,692 | 1/1979 | Ferguson | 248/317 |

*Primary Examiner*—J. Franklin Foss
*Attorney, Agent, or Firm*—John J. Leavitt

[57] ABSTRACT

Presented in two different aspects is a generally U-shaped spring-action device for attachment to overhead beams for the purpose of forming an anchor to which suspensory rods may be attached for suspending ceilings, pipes, ducts or other structures.

10 Claims, 6 Drawing Figures

SPRING-ACTION SUSPENSORY DEVICE FOR ATTACHMENT TO OVERHEAD BEAMS

BACKGROUND OF THE INVENTION

1. Field of the Invention

This invention relates to hanger-type devices used for suspending pipes and conduits in buildings, and particularly to a spring-action suspensory device incorporating trigger means for initiating the spring-action attachment to overhead beams.

2. Description of Prior Art

It is believed that the art related to this invention is found in Class 248, sub-classes 49, 72, and 74R. A search in this field of search has revealed the following patents: U.S. Pat. Nos. 950,978; 1,784,244; 2,045,307; 2,408,719; 2,451,092; 3,276,800 and 3,298,646.

Referring to each of these patents in turn, it is noted that U.S. Pat. No. 950,978 relates to a pipe hanger device of the scissors-type incorporating a pivot pin about which the crossed arms of the device rotate. Spikes formed on the end of one pair of arms are driven into a beam when the opposite pair of arms are moved toward each other.

U.S. Pat. No. 1,784,244 relates to an adjustable pipe suspender and includes a U-shaped bracket incorporating in one of the legs of the U-shaped bracket a spindle rotatable to advance a pressure plate into physical contact with a beam to which the device is attached. Prongs on the opposite leg of the U-shape bracket and on the pressure plate bite into the beam to prevent slippage.

U.S. Pat. No. 2,045,307 in at least one aspect is similar to the preceding patent in that a U-shaped bracket is provided adapted to embrace a beam to which the bracket is to be attached. Set screws threadably engaging one of the legs of the U-shaped bracket may be advanced so that pointed ends penetrate the beam or joist to which the U-shaped clamp device is attached.

U.S. Pat. No. 2,408,719 relates to a support structure incorporating a toggle arrangement in association with oppositely disposed links pivotally arranged in relation to an actuating rod so that axial displacement of the rod in relation to the links effects opening or closing action of the links in relation to a beam to which it is desired to attach the links.

U.S. Pat. No. 2,451,092 constitutes a utility holder for attachment to a joist or beam, and comprises a U-shaped clamping device stamped from sheet metal and comprising a generally U-shaped configuration formed from two parts welded together at one end to provide a bight therebetween. Projecting from each of the legs of the U-shaped device are pointed spurs arranged so that when the U-shaped hanger or utility member is pushed upwardly in straddling relation to a joist the pointed spurs permit movement of the hanger or holder device in one direction but dig into the associated sides of the joist when it is attempted to pull the holder in the opposite direction.

U.S. Pat. No. 3,276,800 describes a beam clip that appears to be specially adapted for attachment to a metal beam. This structure constitutes a U-shaped member having two parallel legs with the end of one of the legs formed to provide prongs pointed in such a way that they permit application of the clip to the flange of an eye beam, for instance, but gouge into the flange to which the clip is attached when it is attempted to withdraw the clip. To insure retention of the clip on the flange, a screw-threaded stud is adapted to project between the two legs of the clip so as to draw them together into a clamping relationship.

Lastly, U.S. Pat. No. 3,298,646 relates to a beam flange clamp formed to provide a generally U-shaped opening between substantially parallel legs the opposing surfaces of which on one side are provided with teeth 9 adapted to gouge into the surface of the beam flange to which the clamp is attached, while the opposite leg of the U is provided with a spring arm on the end of which is a prong struck from the arm and also adapted to bite and grip the member of the beam flange inserted therebetween.

None of the foregoing prior art patents disclose a structure that constitutes a spring-action suspensory device that is initially held open while being elevated into position and which is automatically triggered so as to resiliently engage an overhead beam when it has reached its final position. Accordingly, it is one of the objects of the present invention to provide a spring-action suspensory device for attachment to overhead beams.

In all of the prior art patents discussed above, with the exception perhaps of U.S. Pat. No. 2,408,719, it is necessary that the person applying the clamp be in close proximity to the clamp to effect attachment thereof to whatever supporting structure it is intended to attach the clamp. Accordingly, another object of the present invention is the provision of a spring actuated suspensory device for attachment to overhead beams which may be attached from a remote point, for example from a supporting floor below the overhead beam.

Heretofore, judging from the prior art developed from the field of search indicated above, pipe suspensory devices have been divided into two different types, i.e., the type of clamp device that is attached to a wooden beam, and the type of clamp that is attached to a metal beam. It is one of the objects of the present invention to provide a spring-action suspensory device which is applicable for attachment to both wooden and metal beams without significant change in structural characteristics.

With the advent of increased labor costs, it is important that suspensory devices of the type used to suspend pipes and other structures from beams, especially in commercial buildings, be applicable with very little time wasted in preparing the clamp for attachment, or incorporating screw-threaded devices that require the climbing of a ladder, for instance, to place the person installing the clamp in close proximity to the clamp to manipulate the screw-threaded device to effect attachment of the clamp. Accordingly, another object of the invention is the provision of a spring action suspensory device incorporating a trigger mechanism that is automatically actuated when the clamp is elevated into final position.

A still further object of the invention is the provision of a spring suspensory device that may be mass produced and which incorporates a trigger mechanism that may be cocked and locked during shipment and storage and which may be easily unlocked at the time of application.

The invention possesses other objects and features of advantage, some of which, with the foregoing, will be apparent from the following description and the drawings. It is to be understood however that the invention is not limited to the embodiment illustrated and described, since it may be embodied in various forms within the scope of the appended claims.

SUMMARY OF THE INVENTION

In terms of broad inclusion, the spring action suspensory device of the invention comprises a generally U-shaped structure fabricated from a flat bar of spring steel bent back upon itself into a generally horseshoe configuration, with the ends of the strap being bent inwardly toward each other to provide a throat therebetween. The inwardly projecting ends may be blunt or may be provided with points. Operatively disposed between opposite legs of the U-shaped inherently resilient strap member is a trigger mechanism which in one position retains the inherently resilient legs of the U-shaped clamp spread apart so as to retain the throat open, and which in an alternative position permits the spring steel resilient legs to resiliently press inwardly to engage the ends of the strap with an associated beam. Means are provided for retaining the trigger mechanism in a locked condition to prevent inward resilient movement of the two opposite legs of the U-shaped clamp until it is ready to be attached to a beam.

DESCRIPTION OF THE PREFERRED EMBODIMENT

In terms of greater detail, the spring-action suspensory device for attachment to overhead beams constituting the subject matter of this invention comprises a structure which may be mass produced to minimize the expense to ultimate customers, and constitutes a device which may be "conditioned" at the factory and shipped to ultimate distributors and customers in such "conditioned" form to minimize the amount of time required by an applicator to attach the suspensory device to a supporting structure such as an overhead wooden or metal beam.

As indicated above in the discussion of the prior art, most hangers or supporting devices for pipes and other structures adapted to be attached to wooden and metal beams which generally overlie a floor area at some considerable height, especially in industrial and commercial buildings, are designed in such a way that the applicator must place himself in close proximity to the hanger device in order to attach it to the supporting beam. To place himself in such close proximity, it is generally necessary that the applicator be elevated to such position. This may be done by a so called "cherry picker" constituting a basket within which the applicator stands while it is elevated on the end of an articulated boom.

Another method of placing himself in close proximity to the hanger device is to climb a ladder and, with appropriate tools, accomplish the attachment of the hanger device to the supporting beam. These methods of attachment require an inordinate amount of time and at todays levels of labor cost, time is expensive. The additional equipment, such as ladders and articulated booms, is also expensive, whether it be owned by the contractor, or rented from an equipment company whose business it is to provide such equipment for short periods of time.

The spring actuated suspensory device of this invention obviates these disadvantages by providing a structure that may be "conditioned" at the factory for attachment to a supporting beam, and which when received by the applicator, need be only mounted on the end of a suspensory rod, which must be attached in any event, with the suspensory rod then being used as a handle to hoist the suspensory device into its ultimate position. It should be understood that this assembly of the suspensory rod to the "conditioned" clamping device is performed at the site while the applicator is safely standing on a floor surface below the beam.

Figures 2, 3:
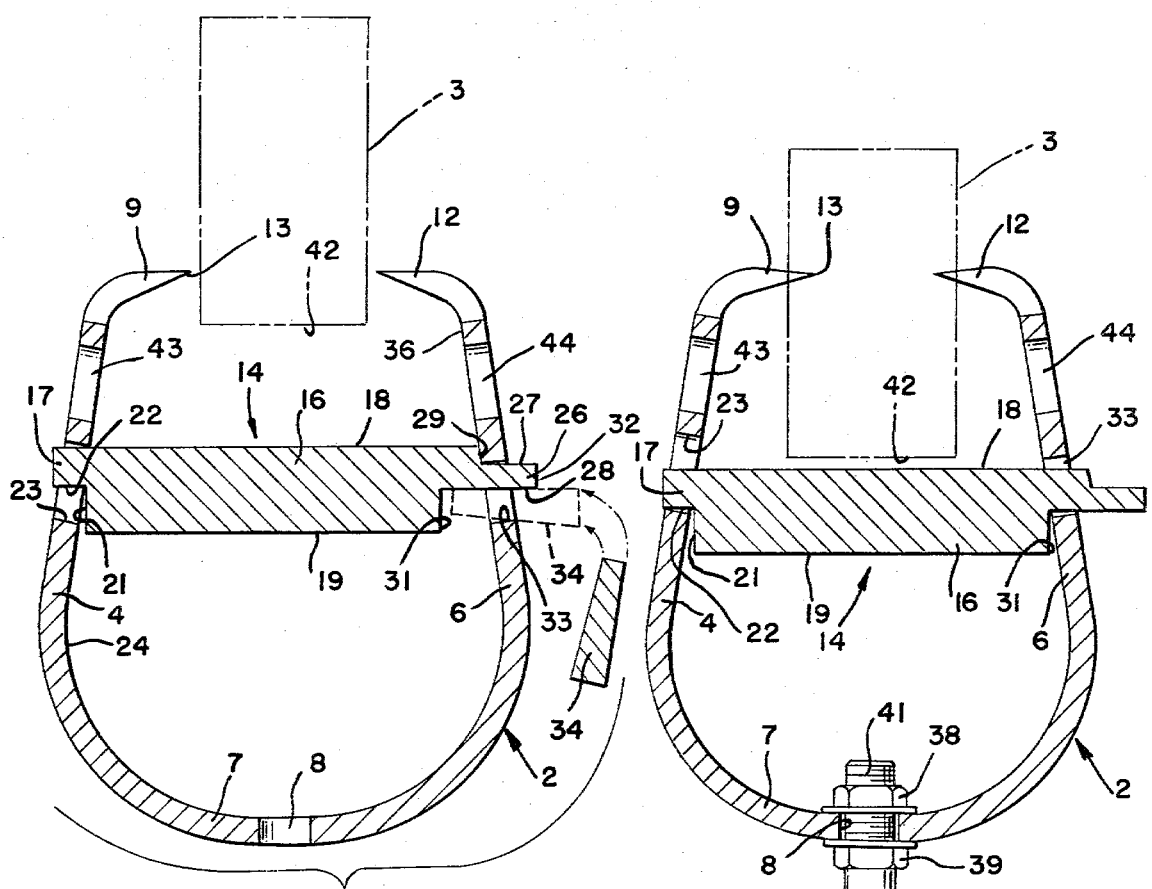
FIG. 2 is an enlarged view in vertical section illustrating the suspensory device of FIG. 1 cocked and ready for application to a beam, the latter being shown in broken lines.
FIG. 3 is a view similar to FIG. 2 illustrating the suspensory device of FIG. 1 triggered and fully engaged on a wooden beam, the latter being shown in broken lines.
Figure 1:
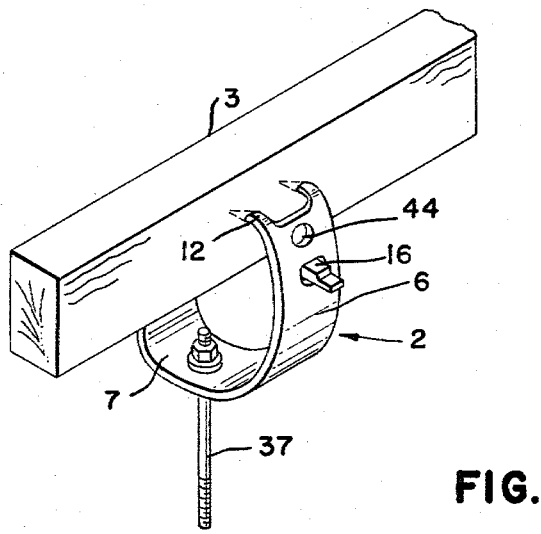
FIG. 1 is a perspective view of one embodiment of the invention shown attached a wooden beam or joist.

Referring to FIGS. 1, 2 and 3, it will there be seen that the suspensory device comprises a generally U-shaped structure designated generally by the numeral 2, and is adapted to be engaged to and suspended from a wooden beam 3. The suspensory device includes an elongated strap, preferably fabricated from spring steel, and formed into a general U-shape to provide spaced legs 4 and 6 joined integrally by a base portion 7 having a central aperture 8 therein for purposes which will hereinafter be explained. The free ends of legs 4 and 6 are provided with inwardly extending projections 9 and 12, respectively, the projections in this embodiment being provided with sharp points adapted to penetrate the body of the wooden beam 3 when the device is triggered to effect engagement thereof.

Spaced from the connecting base portion 7 of the U-shaped suspensory device, and spaced also from the inwardly projecting portions 9 and 12, there is provided a trigger mechanism designated generally by the numeral 14, and including a transversely extending elongated trigger bar or rod 16 having an axial projection 17 at one end disposed between the top surface 18 and the bottom surface 19 of the trigger bar. The projection 17 projects longitudinally from the end surface 21 of the bar and is defined by the top surface 18 of the bar and a lower surface 22. The depth of the bar measured between the top surface 18 and the bottom surface 19 is such as to prevent passage of the bar through an aperture 23 formed in the leg 4. However, the aperture is sufficiently large that the bar projection 17 is permitted to extend through the aperture 23 in such manner that the end surface 21 of the bar abuts the inner surface 24 of the leg 4.

At the opposite end of the bar 16, the bar is provided with an axial projection 26 defined by a top surface 27 and a bottom surface 28, the top surface 27 being interrupted by a shoulder 29 intercepting top surface 18 of the bar, while the bottom surface 28 of projection 26 extends to a shoulder 31 on the bar extending from and intercepting the lower surface 19. As seen in FIG. 2, the surface 28 is longer than the surface 27, placing the shoulder 29 closer to the extreme end 32 of projection 26. Additionally, the depth of the projection 26 measured between the surface 27 and the surface 28 is less than the diameter of aperture 33 formed in leg 6 for a reason which will hereinafter be explained, while the depth of the bar measured between surfaces 18 and 19 is greater than the diameter of the aperture 33.

Comparing FIGS. 2 and 3, it will be seen that in FIG. 2 the trigger bar 16 is held in elevated position by a keeper 34 (shown in broken lines) inserted in the aperture 33 beneath the extension 26 and abutting the lower periphery of the aperture 33 and the lower surface 28 of the projection 26. This represents the "conditioned" state of the suspensory device when it is shipped from the manufacturer to a distributor or retail outlet or applicator. The keeper 34 is preferably wedge shaped as illustrated, fabricated from an appropriate material such as plastic, and underlies the projection 26 in a manner that frictional resistance retains it in position against inadvertent removal, thus preventing lateral displacement of the trigger bar.

As illustrated in FIG. 2, shoulder 29 of trigger bar 16 rests against the inner surface 36 of arm 6, and since the end surface 21 abuts the inner surface 24 of leg 4, the distance between end surface 21 and shoulder 29 is calculated to retain the inherently resilient legs 4 and 6 and inwardly projecting points 13 spaced sufficiently apart to permit the passage therebetween of the beam 3. The legs 4 and 6, being inherently resilient, are normally biased toward each other by such inherent resilience, but are retained in a spread apart "condition" by the trigger bar 16. This is accomplished by impingement of shoulder 29 on the inner surface 36 of the leg 6.

When the suspensory device is received by the applicator, it is received with the lock wedge or keeper 34 in position, thus retaining the trigger bar immovable. The device is left in this condition until after the applicator applies the suspensory rod 37 to the intermediate base portion 7 of the suspensory device through use of aperture 8 as shown in FIG. 3. Application of the suspensory rod is made by two clamp nuts 38 and 39. Once this assembly has been completed, which may be accomplished in the comparative safety of a flat floor area where the clamps are to be attached, the applicator removes the lock wedge or keeper 34 from beneath the trigger bar 16, being careful not to dislodge the trigger bar 16. This action effectively "cocks" the suspensory device.

Once the keeper 34 is removed, it will be obvious that a substantial space is provided in the aperture 33 below the projection 26. Next, the applicator elevates the suspensory device as illustrated in FIG. 2, so that the beam 3 passes through the throat defined by the inner pointed ends 13 of inwardly projecting portions 9 and 12. Continued elevation of the suspensory device through use of the suspensory rod 37 (FIGS. 1 and 3) continues until the bottom surface 42 of the beam impinges against the top surface 18 of the trigger bar. It will of course be understood that since the device is "cocked", continued upward movement of the suspensory device causes the trigger bar 16 to pivot clockwise about the projection 17 so that the shoulder 29 slips away from the inner surface 36 of the leg 6.

When this occurs, the shoulder 29 of the trigger bar no longer retains the arms 4 and 6 spaced apart, and the inherent resilience of the legs 4 and 6 causes the free ends of the legs carrying points 13 to move inwardly with tremendous force so that the points 13 are embedded in the beam. This attitude of the device and the associated beam is illustrated in FIG. 3. It should be noted that after engagement of the points 13 with the beam 3, the trigger bar 16 remains suspended between the legs 4 and 6 of the suspensory device as a safety feature.

This is an important feature because retention of the trigger bar prevents the trigger bar from being projected through the air where it might cause damage at some point far removed from application of the suspensory device. Stated another way, the interrelationship of the trigger bar 16 with the arms 4 and 6 is such that the trigger bar as illustrated in FIG. 2 keeps the legs 4 and 6 cocked ready for application, but retains the trigger bar trapped between the two arms to prevent it being converted into a projectile when the suspensory device is triggered.

Tests of this structure on a wooden beam have indicated that a suspensory device of the type illustrated in FIG. 1 can support as much as two thousand pounds without pulling out of the wooden beam. In most instances, rather than being pulled out of the beam, the beam is caused to split, thus indicating that the load that may be carried by such a device is limited by the strength of the wooden beam to which it is attached.

When a spring action suspensory device such as the one illustrated in the drawings is attached to a suporting beam, it sometimes becomes necessary to remove the suspensory device. This does not happen often but occassionally the need does arise. To meet that need, referring to FIGS. 1 through 3, the legs 4 and 6 of the device are provided with apertures 43 and 44, respectively, the apertures being useful for insertion of an appropriate tool (not shown) for effecting spreading of the legs 4 and 6 against the inherent resilience thereof.

Figure 5:
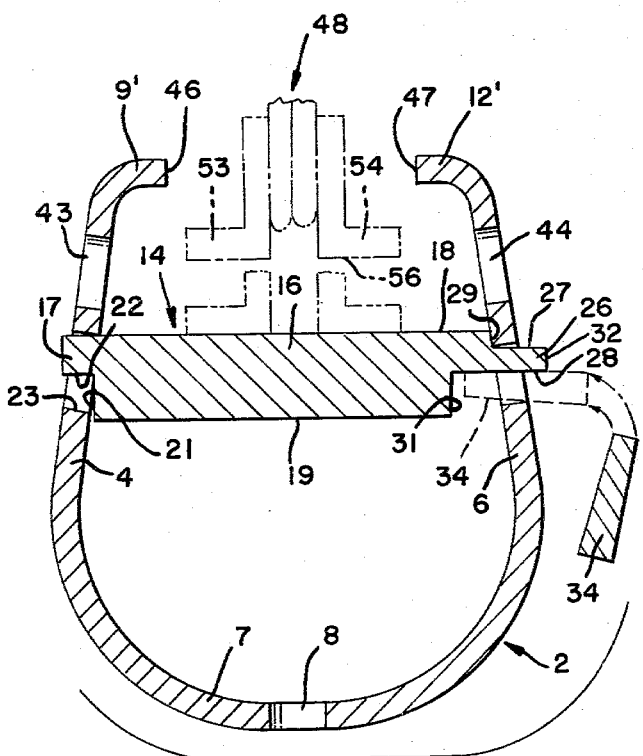
FIG. 5 is a vertical cross sectional view of the embodiment of the invention illustrated in FIG. 4 shown in relation to a beam to which it is to be attached but prior to the suspensory device being triggered.
Figure 6:
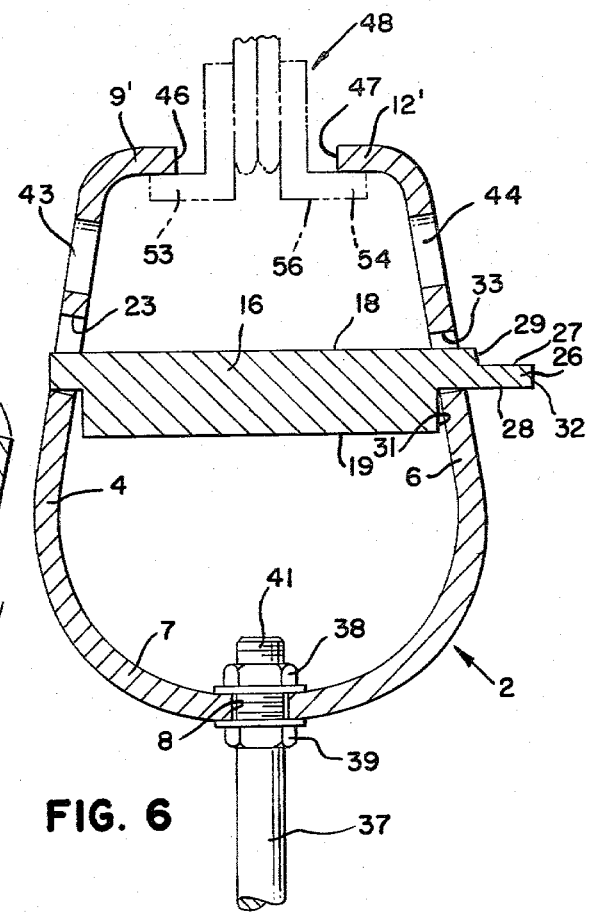
FIG. 6 is a vertical cross sectional view similar to FIG. 5 showing the suspensory device triggered and attached to an associated metal truss structure.
Figure 4:
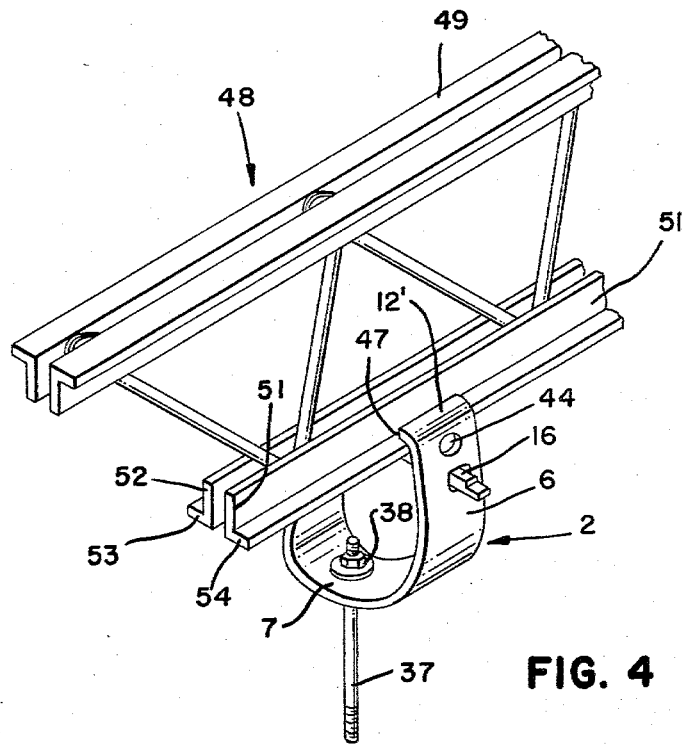
FIG. 4 is a perspective view of a slightly modified embodiment of the suspensory device attached to a metal truss structure.

In the embodiment of the invention illustrated in FIGS. 4-6, the structure is essentially the same and for that reason the same reference numbers have been applied to corresponding elements of the combination. The difference in this embodiment is minor and involves inwardly projecting portions 9' and 12' of legs 4 and 6 which in this embodiment terminate in flat surfaces 46 and 47, respectively, rather than sharp points. The throat defined between the surfaces 46 and 47 define a space through which a metal beam structure 48 may pass as shown. The beam structure 48 frequently takes the form of a truss having an upper beam 49 and a lower beam 51, the lower beam being conveniently formed from a pair of angle bars 52 and 53 arranged back-to-back so as to provide two laterally extending flanges 53 and 54 as shown.

The throat or space between the opposed surfaces 46 and 47 of the suspensory device is sufficient when held in spaced relationship by the trigger bar as illustrated in FIG. 5 to allow passage of the lateral edges of the flanges 53 and 54. As before, continued elevation of the suspensory device causes the upper surface 18 of the trigger bar 16 to impinge against the bottom surfaces 56 of the angle bars, thus displacing the trigger bar downwardly into the position illustrated in FIG. 6, causing the upper ends of the legs 4 and 6 to spring inwardly so that the space between the opposed end faces 46 and 47 is less than the width of the truss members 53-54. The suspensory device is thus suspended from the flanges 53 and 54 without the corresponding penetration of points 13 into an associated wooden beam.

It should be obvious from the foregoing that the spring-action of both of the embodiments illustrated in FIGS. 1–3 and 4–6 is essentially the same, as is the construction of these devices, with the exception of elimination of the points 13 from the FIG. 4–6 embodiment. Additionally, while the wedge-shaped keeper 34 has been illustrated in both FIGS. 2 and 5 in a position of association with the U-shaped member 2, it should be understood that this wedge shaped keeper is removed by the applicator of the suspensory device to "cock" the suspensory device prior to its being elevated into actuating position. Obviously, if it remained in the position illustrated in broken lines in FIGS. 2 and 5, the top surface 18 of the trigger bar could impinge against the lower surfaces 42 and 56 with impunity, the trigger bar remaining stationary and being retained against lateral displacement by the wedge-shaped keeper.

In fact, this feature can be used to advantage in that it sometimes is necessary to measure the correct length of the suspensory rod 37. Because the trigger bar 16 will not be laterally displaced so long as the wedge-shaped keeper is in place, the assembly may be elevated into approximately final position with the keeper in place and the suspensory rod 37 measured for appropriate length before the assembly is lowered and the keeper removed to "cock" the device prior to application. This permits measurement of the suspensory rod 37 in a most accurate manner so as to permit adjustment of it's length prior to placement of the device in engagement with the supporting beam.

Having thus described the invention, what is claimed to be new and novel and sought to be covered by Letters Patent of the United States is as follows:

1. A spring actuated suspensory device for attachment to an overhead beam, comprising:
   (a) a generally U-shaped member including a pair of spaced legs interconnected at one end and extending freely at their opposite ends;
   (b) trigger means interposed between said legs retaining said legs resiliently spaced apart in a first position, said trigger means being laterally displaceable by abutment with said overhead beam to release said legs to allow movement of said legs toward each other under the impetus of the inherent resilience thereof to thereby cause the freely extending ends of the spaced legs to engage the beam.

2. The combination according to claim 1, in which means are provided interposed removably between said trigger means and one of said legs to retain said trigger means against lateral displacement.

3. The combination according to claim 1, in which the free ends of said legs are provided with inwardly projecting portions defining a throat therebetween.

4. The combination according to claim 1, in which the free ends of said legs are provided with mutually reaching pointed portions defining a throat therebetween, said pointed portions being adapted to gouge into a wooden beam thrust through said throat and into impinging contact with said trigger means with sufficient force to effect lateral displacement of said trigger means.

5. The combination according to claim 1, in which said U-shaped member constitutes a spring steel strap of predetermined length turned back upon itself to provide two spaced legs interconnected by a cross member provided with an aperture therein, and suspensory rod means extending through said aperture and attached to said cross member.

6. A spring actuated suspensory device for attachment to an overhead beam, comprising:
   (a) a generally U-shaped member including a pair of spaced legs interconnected at one end and extending freely at their opposite ends;
   (b) trigger means interposed between said legs retaining said legs resiliently spaced apart in a first position, said means being laterlaly displaceable to allow movement of said legs toward each other; and
   (c) said spaced legs are provided with apertures generally arranged coaxially about an axis common to both apertures, said trigger means comprise a bar extending transversely between said legs, each end of said trigger bar engaging an aperture in the associated leg.

7. A spring actuated suspensory device for attachment to an overhead beam, comprising:
   (a) a generally U-shaped member including a pair of spaced legs interconnected at one end and extending freely at their opposite ends; and
   (b) trigger means interposed between said legs retaining said legs resiliently spaced apart in a first position, said trigger means being laterally displaceable to allow movement of said legs toward each other;
   (c) said trigger means comprising an elongated bar disposed transversely between said legs, opposite ends of said bar being provided with opposed shoulders adapted to engage the inner surfaces of said legs and retain the legs resiliently spaced apart, one end of said bar additionally being provided with a second shoulder adapted to ultimately engage the inner surface of the associated leg when the other shoulder on the same end of the trigger bar is disengaged from said inner surface of the leg by transverse displacement of the trigger bar, said shoulders on the common end of the trigger bar being spaced axially whereby the inherent resilience of the U-shaped member causes movement of the legs toward each other an amount equal to the distance between said shoulders.

8. The method of attachment of a suspensory device including a U-shaped member having inherently resilient legs normally biased to move toward one another and having inwardly projecting portions thereon defining a throat open to a predetermined width when the legs of said U-shaped member are held apart and closed to a predetermined width when said legs are displaced toward each other, comprising the steps of:
   (a) spreading said legs apart against their inherent resilience to open said throat to said predetermined width;
   (b) cocking said legs in said spread apart condition while embracing a beam to which the suspensory device is to be attached; and
   (c) triggering release of said legs to permit inward displacement of the free ends thereof to close said throat to said predetermined width and thereby engage said beam.

9. The method of attachment of a suspensory device including a U-shaped member having inherently resilient legs normally biased to move toward one another and having inwardly projecting portions thereon defining a throat open to a predetermined width when the legs of said U-shaped member are held apart and closed to a predetermined width when said legs are displaced toward each other, comprising the steps of:

(a) spreading said legs apart against their inherent resilience to open said throat to said predetermined width;
(b) retaining said legs in said spread apart condition while embracing a beam to which the suspensory device is to be attached;
(c) inserting a trigger bar to extend transversely between said spread apart resilient legs to impinge thereagainst in a first "cocked" position to retain said throat open to said predetermined width; and
(d) releasing said legs to permit inward displacement of the free ends thereof to close said throat to said predetermined width and thereby engage said beam.

10. The method according to claim 9, in which said trigger bar is caused to impinge against the beam to which the suspensory device is to be attached with sufficient force to displace the trigger bar from a "cocked" position to a position where the throat is closed to said predetermined closed position.

* * * * *